United States Patent [19]

Machida et al.

[11] Patent Number: 4,562,105

[45] Date of Patent: Dec. 31, 1985

[54] FERRIMAGNETIC OXIDES AND MAGNETO-OPTICAL RECORDING MEDIUM EMPLOYING THE SAME

[75] Inventors: Hazime Machida, Tokyo; Motoharu Tanaka, Numazu, both of Japan

[73] Assignee: Ricoh Company, Ltd., Tokyo, Japan

[21] Appl. No.: 595,021

[22] Filed: Mar. 30, 1984

[30] Foreign Application Priority Data

Apr. 8, 1983 [JP] Japan ............................ 58-60800

[51] Int. Cl.$^4$ .............................................. G11B 9/00
[52] U.S. Cl. .................................. 428/161; 428/172; 428/215; 428/332; 428/457; 428/694; 428/702; 428/900; 365/122; 360/135
[58] Field of Search ............... 252/62.56, 62.57, 62.58, 252/62.59, 62.63; 350/375, 376, 377, 378; 428/692, 694, 900, 702, 161, 172, 213, 215, 332, 457; 365/122; 360/135

[56] References Cited

U.S. PATENT DOCUMENTS

| | | | |
|---|---|---|---|
| 3,638,207 | 1/1972 | Smith et al. | 252/62.58 |
| 3,770,639 | 11/1973 | Okazaki et al. | 252/62.58 |
| 3,897,355 | 7/1975 | Arendt et al. | 252/62.58 |
| 4,390,600 | 6/1983 | Ohta et al. | 428/694 |
| 4,412,264 | 10/1983 | Imamura et al. | 360/131 |
| 4,414,650 | 11/1983 | Ohta et al. | 365/122 |
| 4,425,250 | 1/1984 | Hibst | 252/62.59 |
| 4,450,201 | 5/1984 | Brill et al. | 428/698 |
| 4,493,779 | 1/1985 | Kamiyama | 252/62.54 |

FOREIGN PATENT DOCUMENTS

| | | |
|---|---|---|
| 245880 | 1/1963 | Australia . |
| 24834 | of 1971 | Japan . |
| 23677 | of 1974 | Japan . |
| 38919 | of 1974 | Japan . |
| 0002225 | 1/1983 | Japan . |

OTHER PUBLICATIONS

Mat. Res. Bull., vol. 16, No. 12, (Dec.), pp. 1499–1504, (1981), Pergamon Press Ltd.

Primary Examiner—George F. Lesmes
Assistant Examiner—William M. Atkinson
Attorney, Agent, or Firm—Flynn, Thiel, Boutell & Tanis

[57] ABSTRACT

Ferrimagnetic oxides of the following formula,

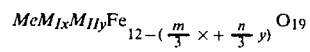

$$MeM_{Ix}M_{IIy}Fe_{12-(\frac{m}{3}x+\frac{n}{3}y)}O_{19}$$

wherein Me represents at least one element selected from the group consisting of Ba, Sr and Pb, $M_I$ is at least one element selected from the group consisting of Ga and Al, $M_{II}$ is at least one element selected from the group consisting of Bi, Gd, Tb, Dy, Ho, La, Y, Co, Zn, Ti, Sc, In, Sn, Ca, Cr, Ni and Ge, $1 \leq x \leq 8$, $0 < y \leq 6$, $1 \leq x+y \leq 8$, m is an ion valence of $M_I$ and n is an ion valence of $M_{II}$, and a magneto-optical recording medium comprising a transparent substrate, a perpendicular magnetic-anisotropic magnetic film layer formed on the substrate, which magnetic film layer comprises one of the ferrimagnetic oxides of the above formula, and a reflection layer formed on the magnetic film layer, are disclosed.

12 Claims, 3 Drawing Figures

FERRIMAGNETIC OXIDES AND MAGNETO-OPTICAL RECORDING MEDIUM EMPLOYING THE SAME

BACKGROUND OF THE INVENTION

The present invention relates to ferrimagnetic oxides having a low curie temperature, not oxidized and not corroded, thus the magnetic characteristics thereof being not deteriorated, and capable of allowing recording and reproducing of information or data by application of laser beams thereto when used in a magnetic film layer of a magneto-optical recording medium, and to a magneto-optical recording medium including a perpendicular magnetic-anisotropic magnetic film layer comprising one of the ferrimagnetic oxides.

Conventionally, magneto-optical recording mediums having an amorphous magnetic layer are known. The amorphous magnetic layer is easily oxidized, and if it is oxidized, the magneto-optical characteristics thereof are significantly deteriorated. Therefore, it is necessary to provide a protective layer for protecting the amorphous magnetic layer immediately after the formation of the magnetic layer. However, it is extremely difficult to prepare a protective layer completely free from pin holes.

Furthermore, when producing the magnetic film layer, a relatively large amount of oxygen still remains in a chamber for fabricating the magnetic film layer and the oxygen enters the magnetic film layer, so that the magnetic film layer is oxidized by the oxygen. Such oxidization is accelerated by the application of light and heat at the time of recording and reproducing data or information. As a result, the magneto-optical characteristics thereof are deteriorated.

A hexagonal-system M-type ferrite has been investigated for use as a magnetic bubble material as being a magnetic material free from deterioration by oxidation. This material, however, has a curie temperature as high as 450° C. or more, so that it cannot be used as a magneto-optical recording material for recording by application of laser beams thereto.

SUMMARY OF THE INVENTION

It is therefore an object of the present invention to provide ferrimagnetic oxides having a low curie temperature with improved magneto-optical characteristics including a large Faraday angle, not oxidized and not corroded, thus the magnetic characteristics thereof not deteriorated, and capable of allowing recording and reproducing of information or data by application of laser beams thereto when used in a magnetic film layer of a magneto-optical recording medium.

Another object of the present invention is to provide a magneto-optical recording medium including a perpendicular magnetic-anisotropic magnetic film layer comprising one of the above ferrimagnetic oxides.

A further object of the present invention is to provide a magneto-optical recording medium of the above-mentioned type, having a sufficiently low curie temperature for allowing recording by semiconductor laser beams.

According to the present invention, the above objects can be attained by (i) ferrimagnetic oxides of the following formula:

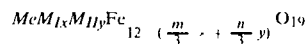

$$MeM_{Ix}M_{IIy}Fe_{12-(\frac{m}{3}x+\frac{n}{3}y)}O_{19}$$

wherein Me represents at least one element selected from the group consisting of Ba, Sr and Pb, $M_I$ is at least one element selected from the group consisting of Ga and Al, $M_{II}$ is at least one element selected from the group consisting of Bi, Gd, Tb, Dy, Ho, La, Y, Co, Zn, Ti, Sc, In, Sn, Ca, Cr, Ni and Ge, $1 \leq x \leq 8$, $0 < y \leq 6$, $1 \leq x+y \leq 8$, m is an ion valence of $M_I$ and n is an ion valence of $M_{II}$, and by (ii) a magneto-optical recording medium comprising a transparent substrate, a perpendicular magnetic-anisotropic magnetic film layer formed on the substrate, which perpendicular magnetic-anisotropic magnetic film layer comprises one of the ferrimagnetic oxides of the above formula, and a reflection layer formed on the magnetic film layer.

For improvement of the magneto-optical characteristics of the magnetic film layer, a transparent dielectric layer can be interposed between the magnetic film layer and the reflection layer.

DETAILED DESCRIPTION OF THE PREFERRED EMBODIMENTS

The ferrimagnetic oxides for fabricating a magnetic film layer for use in the present invention are improved so as to have a decreased curie temperature for suitable use in magneto-optical recording mediums, as compared with the conventional $MeFe_{12}O_{19}$-type ferrimagnetic oxides in which Me is, for example, Ba, Sr or Pb and which have curie temperatures as high as 400° C. or more and cannot be used for magneto-optical recording mediums.

More specifically, in the ferrimagnetic oxides for use in the present invention, part of Fe atoms are replaced by at least one of the elements of $M_I$, that is, Ga or Al or both of them, each of which has an ion radius smaller than the ion radius of Fe atom and can easily replace Fe atoms, whereby the curie temperature thereof is decreased. When part of the Fe atoms in the oxides are replaced by Ga or Al or by both of them, although the curie temperature of the ferrimagnetic oxides can be decreased, the coercive force (Hc) thereof increases to the extent that recording by laser beams becomes difficult. In order to eliminate this shortcoming, part of Fe atoms of the magnetic oxides are also replaced by at least one of the elements of $M_{II}$, that is, by Bi, Tb, Gd, Dy, Ho, La, Y, Co, Zn, Ti, Sc, In, Sn, Ca, Cr, Ni or Ge, whereby the magnetic and magneto-optical characteristics of the magnetic oxides including the Faraday rotation angle thereof are improved.

The following are representative examples of the magnetic oxides for use in the present invention:

| | | |
|---|---|---|
| $BaAlGa_4Fe_7O_{19}$, | $SrAlGa_{4.5}Fe_5O_{19}$, | $BaAlGa_2Ge_3Fe_6O_{19}$, |
| $BaAlGe_{3.75}Fe_6O_{19}$, | $PbAlGe_{4.5}Fe_5O_{19}$, | $BaAl_2Ga_3Fe_7O_{19}$, |
| $SrAlGe_{3.75}Fe_6O_{19}$, | $SrLaGa_{3.75}Fe_6O_{19}$, | $BaGa_2TbFe_8O_{19}$, |
| $BaGa_3DyFe_8O_{19}$, | $SrGaTb_3Fe_8O_{19}$, | $BaGa_4Gd_3Fe_5O_{19}$, |
| $BaYGa_4Fe_7O_{19}$, | $BaGa_3BiFe_8O_{19}$, | $SrGa_4Bi_2Fe_6O_{19}$, |
| $BaGa_4Bi_2Fe_6O_{19}$, | $BaGa_{3.33}CoFe_7O_{19}$, | $SrGa_4In_2Fe_6O_{19}$, |
| $BaGa_3Sc_3Fe_6O_{19}$, | $BaGa_5ZnFe_6O_{19}$, | $SrAlGe_3Fe_7O_{19}$, |
| $BaAlGe_3Fe_7O_{19}$, | $PbAlGe_3Fe_7O_{19}$, | $BaGa_4ZnFe_7O_{19}$, |
| $BaGa_3Gd_3Fe_5O_{19}$, | $BaGa_3Bi_2Fe_7O_{19}$, | |
| $SrGa_5Sn_{1.5}Fe_5O_{19}$, | $SrGa_4Ti_2Fe_6O_{19}$. | |

Referring to the accompanying drawings, the present invention will now be explained in detail.

Figure 1:
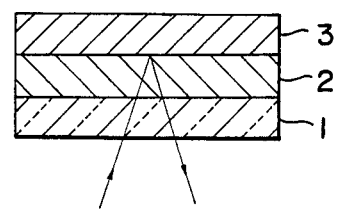
FIG. 1 is a schematic cross-sectional view of an embodiment of a magneto-optical recording medium according to the present invention.

FIG. 1 shows schematically the cross section of an embodiment of a magneto-optical recording medium according to the present invention. As shown in the figure, the magneto-optical recording medium according to the present invention comprises a transparent substrate 1, a magnetic film layer 2 formed thereon and a reflection film layer 3 formed on the magnetic film layer 2.

As the material for the transparent substrate 1, for instance, quartz glass and Pyrex glass can be employed.

The magnetic film layer 2 can be formed with a thickness ranging from 1,000 Å to 100,000 Å on the transparent substrate 1 by depositing the ferrimagnetic oxide of the above-mentioned formula by the sputtering method, the evaporation method or the ion-plating method.

As the material for the reflection layer 3, for example, metals such as Cu, Al, Ag, Au and Pt, and nitrides such as TiN and TaN can be employed. It is preferable that the thickness of the reflection layer 3 be in the range of 200 Å to 5,000 Å.

Figure 2:
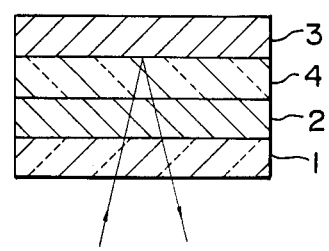
FIG. 2 is a schematic cross-sectional view of another embodiment of a magneto-optical recording medium according to the present invention.

Referring to FIG. 2, there is shown a schematic cross section of another embodiment of a magneto-optical recording medium according to the present invention. As shown in the figure, a transparent dielectric layer 4 is interposed between the magnetic film layer 2 and the reflection layer 3 for improvement of the magneto-optical characteristics of the magnetic film layer 2, that is, for enhancement of the Faraday angle of the magnetic film layer 2.

As the material for the transparent dielectric layer 4, for instance, $SiO_2$, $SiO$, $TiO_2$, $TiO$ and $CeO_2$ can be employed.

Figure 3:
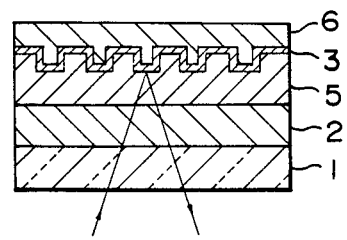
FIG. 3 is a schematic cross-sectional view of a further embodiment of a magneto-optical recording medium according to the present invention.

Referring to FIG. 3, there is shown a schematic cross section of a further embodiment of a magneto-optical recording medium according to the present invention. As shown in the figure, a protective layer 6 for protecting the reflection layer 3 can be formed on the reflection layer 3. The protective layer can be made of, for example, plastics, TiN, $Si_3N_4$, TaN, $SiO_2$, SiO or $TiO_2$. Furthermore, as shown in FIG. 3, a guide layer 5 having guide grooves for guiding the application of laser beams when recording and reproducing information or data can be interposed between the magnetic layer 2 and the reflection layer 3. The guide layer 5 can be formed, for instance, by applying a U.V. polymer to the magnetic film layer 2, bringing a metallic mold with the guide grooves into pressure contact with the applied U.V. polymer, and hardening the applied U.V. polymer to form the guide layer 5. After the guide layer 5 has been hardened, the metallic mold is removed from the guide layer 5, and the reflection layer 3 is formed on the guide layer 5 by the sputtering method or by the evaporation method.

Referring to the following examples, embodiments of a magneto-optical recording medium according to the present invention will now be explained in detail.

EXAMPLE 1

$SiO_2$ was first deposited with a thickness of 1,000 Å on a quartz glass substrate by sputtering.

A magnetic film layer was then deposited with a thickness of 10,000 Å on the $SiO_2$-deposited substrate by sputtering from a target consisting of $BaAlGa_4$-$Fe_7O_{19}$, with the temperature of the substrate maintained at 550° C., the partial pressure of oxygen at 0.3 mm Torr, the entire gas pressure at 60 mm Torr, and the fabrication speed of the magnetic film layer being at 25 Å/min.

On the thus formed magnetic film layer, there was formed a reflection layer of Al with a thickness of 1,000 Å, whereby a magneto-optical recording medium No. 1 according to the present invention was prepared.

The magnetic characteristics of the recording medium No. 1 were excellent as follows:

Tc=210° C., Ms=80 emu/cc, and Hc=4.5 KOe.

A magnetic field of 10 KOe was applied to the recording medium No. 1, so that the recording medium was totally magnetized in one magnetization direction. Thereafter, a magnetic field of 0.5 KOe with a magnetization direction opposite to the above-mentioned magnetization direction was applied to the thus magnetized recording medium, while applying thereto semi-conductor laser beams having a wavelength of 800 nm, with an output power of 10 mW, in the form of pulses of a frequency of 1 MHz, at about 5 mW on the surface of the recording medium, whereby recording was performed on the recording medium No. 1, with the initial magnetization direction reversed. As a result, the diameter of the recorded bits was about 15,000 Å.

EXAMPLE 2

Example 1 was repeated except that the target of $BaAlGa_4Fe_7O_{19}$ employed in Example 1 was replaced with a target of $SrAlGa_4Fe_7O_{19}$, whereby a magneto-optical recording medium No. 2 according to the present invention was prepared.

The magnetic characteristics of the recording medium No. 2 were excellent as follows:

Tc=220° C., Ms=100 emu/cc, and Hc=4.0 KOe.

EXAMPLE 3

Example 1 was repeated except that the target of $BaAlGa_4Fe_7O_{19}$ employed in Example 1 was replaced with a target of $BaAl_2Ga_3Fe_6O_{19}$, whereby a magneto-optical recording medium No. 3 according to the present invention was prepared.

The magnetic characteristics of the recording medium No. 3 were excellent as follows:

Tc=220° C., Ms=100 emu/cc, and Hc=4.0 KOe.

EXAMPLE 4

Example 1 was repeated except that the target of $BaAlGa_4Fe_7O_{19}$ employed in Example 1 was replaced with a target of $BaGa_4Bi_2Fe_6O_{19}$, whereby a magneto-optical recording medium No. 4 according to the present invention was prepared.

The magnetic characteristics of the recording medium No. 4 were excellent as follows:

Tc=200° C., Ms=50 emu/cc, and Hc=3.0 KOe.

EXAMPLE 5

Example 1 was repeated except that the target of $BaAlGa_4Fe_7O_{19}$ employed in Example 1 was replaced with a target of $SrGa_4TbFe_7O_{19}$, whereby a magneto-optical recording medium No. 5 according to the present invention was prepared.

The magnetic characteristics of the recording medium No. 5 were excellent as follows:

Tc=210° C., Ms=70 emu/cc, and Hc=10.5 KOe.

EXAMPLE 6

Example 1 was repeated except that the target of $BaAlGa_4Fe_7O_{19}$ employed in Example 1 was replaced with a target of $BaGa_4DyFe_7O_{19}$, whereby a magneto-optical recording medium No. 6 according to the present invention was prepared.

The magnetic characteristics of the recording medium No. 6 were excellent as follows:

Tc=180° C., Ms=50 emu/cc, and Hc=1.0 KOe.

EXAMPLE 7

Example 1 was repeated except that the target of $BaAlGa_4Fe_7O_{19}$ employed in Example 1 was replaced with a target of $BaGa_3YFe_8O_{19}$, whereby a magneto-optical recording medium No. 7 according to the present invention was prepared.

The magnetic characteristics of the recording medium No. 7 were excellent as follows:

Tc=210° C., Ms=100 emu/cc, and Hc=3.0 KOe.

COMPARATIVE EXAMPLE

A comparative magneto-optical recording medium was prepared by forming an amorphous magnetic film layer with an atomic composition of Tb/Fe=22/78 by sputtering with a thickness of 3,000 Å on a glass substrate, followed by forming thereon a protective layer of $SiO_2$ with a thickness of 2,000 Å.

The magneto-optical recording mediums No. 1 through No. 7 according to the present invention and the comparative recording medium were subjected to the two forced storage test (i) under the condition of 70° C. and 90% RH and (ii) under the condition of 200° C. and normal room humidity, respectively for 400 hours, to see the oxidation of those recording mediums and the deterioration of the magnetic characteristics thereof.

The results are in the following table.

With the magneto-optical recording mediums No. 1 through No. 7, substantially no deterioration of the magnetic characteristics thereof was observed after the forced storage tests.

However, the comparative magneto-optical recording medium was considerably oxidized during the storage tests due to the presence of pin holes in the protective layer, and due to the presence of oxygen within in the magnetic film layer, so that the Hc (intrinsic coercive force) of the recording medium was significantly lowered.

EXAMPLE 8

On a quartz glass disc with a diameter of 120 mm serving as a substrate, there was first formed a C-axis orientation film of ZnO with a thickness of 500 Å by sputtering deposition, and a magnetic film layer was then formed thereon with a thickness of 20,000 Å by the Rf. magnetron sputtering method from a pair of targets of $BaAlGa_5Fe_6O_{19}$. To this magnetic film layer, there was applied a U.V. polymer, and a metallic mold with grooves having a track pitch of 30,000 Å, a groove depth of 1,000 Å, and a track width of 10,000 Å was then brought into pressure contact with the applied U.V. polymer layer. Thereafter, the U.V. polymer layer was exposed to ultra violet light from the side of the first mentioned substrate, thereby hardening the U.V. polymer layer, and the metallic mold was then removed from the U.V. polymer layer, whereby a guide layer having the above-mentioned guide grooves for guiding the application of laser beams when recording and reproducing information or data was formed on the magnetic film layer. A reflection layer of Ag was formed with a thickness of 1,000 Å on the guide layer on the side of the grooves by sputtering. Furthermore, a protective layer of polymethylmethacrylate for protecting the reflection layer was formed with a thickness of 100 μm by spin coating, whereby a magneto-optical recording medium No. 8 in the shape of a disc according to the present invention was prepared.

The magnetic characteristics of the recording medium No. 8 were excellent as follows:

Tc=205° C., Ms=70 emu/cc, and Hc=5.5 KOe.

A magnetic field of 10 KOe was applied to the recording medium No. 8, so that the recording medium was totally magnetized in one magnetization direction. Thereafter, a magnetic field of 0.5 KOe with a magnetization direction opposite to the above-mentioned magnetization direction was applied to the thus magnetized recording medium, while applying thereto semi-con-

|  | Initial Magneto-Optical Characteristics | | Forced Storage Tests | | | |
|---|---|---|---|---|---|---|
|  |  |  | 70° C., 90% (RH) | | 200° C. Normal Room Humidity | |
|  | Ms(emu/cc) | Hc(KOe) | Ms(emu/cc) | Hc(KOe) | Ms(emu/cc) | Hc(KOe) |
| Example |  |  |  |  |  |  |
| 1 | 80 | 4.5 | 80 | 5.0 | 85 | 4.5 |
| 2 | 100 | 4.0 | 100 | 4.0 | 105 | 4.0 |
| 3 | 100 | 4.0 | 100 | 4.0 | 110 | 4.5 |
| 4 | 50 | 3.0 | 50 | 3.0 | 65 | 4.0 |
| 5 | 70 | 10.5 | 80 | 9.5 | 85 | 11.0 |
| 6 | 50 | 1.0 | 55 | 0.9 | 45 | 1.2 |
| 7 | 100 | 3.0 | 90 | 2.5 | 100 | 4.0 |
| Comparative Example | 150 | 2.0 | 200 | 0.5 | 250 | 0.7 | ductor laser beams having a wavelength of 800 nm with an output power of 10 mW, in the form of pulses of a frequency of 1 MHz, at about 5 mW on the surface of the recording medium, whereby recording was performed on the recording medium No. 8, with the initial magnetization direction reversed. The diameter of the recorded bits was about 15,000 Å.

EXAMPLE 9

On a quartz glass disc with a diameter of 120 mm serving as a substrate, there was first formed a C-axis orientation film of ZnO with a thickness of 500 Å by sputtering deposition, and a magnetic film layer was formed thereon with a thickness of 20,000 Å by the Rf. magnetron sputtering method from a pair of target of $BaGa_3YFe_8O_{19}$. To this magnetic film layer, there was formed a transparent dielectric layer of $SiO_2$ with a thickness of 2,000 Å by sputtering.

A reflection layer of Al was formed with a thickness of 500 Å on the transparent dielectric layer by sputtering, whereby a magneto-optical recording medium No. 9 in the shape of a disc according to the present invention was prepared.

The magnetic characteristics of the recording medium No. 9 were excellent as follows:

$Tc = 210°$ C., $Ms = 80$ emu/cc, and $Hc = 4.5$ KOe.

The thus prepared magneto-optical recording mediums according to the present invention are more resistant to oxidation and stabler and exceedingly better in the magnetic characteristics as compared with the conventional magneto-optical recording mediums having the amorphous magnetic layers.

What is claimed is:

1. A magneto-optical recording medium comprising a transparent substrate, a perpendicular, magnetic-anisotropic, magnetic film layer formed thereon, which magnetic film layer comprises a ferrimagnetic oxide of the following formula

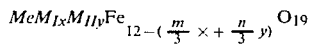

$$MeM_{Ix}M_{IIy}Fe_{12-(\frac{m}{3}x+\frac{n}{3}y)}O_{19}$$

wherein Me represents at least one element selected from the group consisting of Ba, Sr and Pb, $M_I$ is at least one element selected from the group consisting of Ga and Al, $M_{II}$ is at least one element selected from the group consisting of Bi, Gd, Tb, Dy, Ho, La, Y, Co, Zn, Ti, Sc, In, Sn, Ca, Cr, Ni and Ge, $1 \leq x \leq 8$, $0 < y \leq 6$, $1 \leq x + y \leq 8$, m is an ion valence of $M_I$ and n is an ion valence of $M_{II}$, and a reflection layer formed on the magnetic film layer.

2. A magneto-optical recording medium as claimed in claim 1, wherein the thickness of said magnetic film layer is in the range of 1,000 Å to 100,000 Å.

3. A magneto-optical recording medium as claimed in claim 1, wherein said reflection layer comprises a metal or nitride selected from the group consisting of Cu, Al, Ag, Au, Pt, TiN and TaN.

4. A magneto-optical recording medium as claimed in claim 1, wherein the thickness of said reflection layer is in the range of 200 Å to 5,000 Å.

5. A magneto-optical recording medium as claim in claim 1, further comprising a transparent dielectric layer formed between said magnetic film layer and said reflection layer.

6. A magneto-optical recording medium as claimed in claim 5, wherein said transparent dielectric layer comprises an oxide selected from the group consisting of $SiO_2$, $SiO$, $TiO_2$, $TiO$ and $CeO_2$.

7. A magneto-optical recording medium as claimed in claim 1 in which said magnetic film layer is a vapor-deposited film layer which has been formed on said substrate by evaporation, sputtering or ion plating.

8. A magneto-optical recording medium as claimed in claim 1, further comprising a protective layer for protecting said reflection layer, which protective layer is formed on said reflection layer.

9. A magneto-optical recording medium as claimed in claim 8, wherein said protective layer comprises a material selected from the group consisting of TiN, $Si_3N_4$, TaN, $SiO_2$ and SiO.

10. A magneto-optical recording medium as claimed in claim 1, further comprising a guide layer having guide grooves for guiding the application of laser beams at the time of recording and reproduction, which guide layer is interposed between said magnetic film layer and said reflection layer.

11. A magneto-optical recording medium as claimed in claim 10, further comprising a protective layer for protecting said reflection layer, which protective layer is formed on said reflection layer.

12. A magneto-optical recording medium comprising a transparent substrate, a vapor-deposited, perpendicular, magnetic-anisotropic, magnetic film layer formed thereon by evaporation or sputtering, which magnetic film layer has a thickness in the range of 1000 Å to 100,000 Å and consists of a ferrimagnetic oxide of the following formula

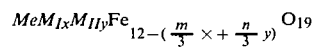

$$MeM_{Ix}M_{IIy}Fe_{12-(\frac{m}{3}x+\frac{n}{3}y)}O_{19}$$

wherein Me represents at least one element selected from the group consisting of Ba, Sr and Pb, $M_I$ is at least one element selected from the group consisting of Ga and Al, $M_{II}$ is at least one element selected from the group consisting of Bi, Gd, Tb, Dy, Ho, La, Y, Co, Zn, Ti, Sc, In, Sn, Ca, Cr, Ni and Ge, $1 \leq x \leq 8$, $0 < y \leq 6$, $1 \leq x + y \leq 8$, m is an ion valence of $M_I$ and n is an ion valence of $M_{II}$, and a reflection layer formed on the magnetic film layer, said reflection layer having a thickness in the range of from 200 Å to 5000 Å.

* * * * *